United States Patent [19]

Sandstrom

[11] Patent Number: 4,852,831
[45] Date of Patent: Aug. 1, 1989

[54] PIPE SUPPORT SYSTEM

[76] Inventor: Wayne R. Sandstrom, Box 2414, Fairbanks, Ak. 99707

[21] Appl. No.: 100,203

[22] Filed: Sep. 23, 1987

[51] Int. Cl.⁴ .............................................. F16L 3/00
[52] U.S. Cl. ..................................... 248/58; 138/149; 285/47
[58] Field of Search ...................... 248/49, 58; 285/47; 138/148, 149, 112

[56] References Cited

U.S. PATENT DOCUMENTS

| | | |
|---|---|---|
| 433,882 | 8/1890 | Belding . |
| 577,284 | 2/1897 | Camp . |
| 664,950 | 1/1901 | Hewling ........................ 138/148 X |
| 1,853,736 | 4/1932 | Lawrence . |
| 2,003,580 | 6/1935 | Craighead . |
| 2,041,911 | 5/1936 | Ericson ......................... 138/148 X |
| 2,099,756 | 11/1937 | Seigle . |
| 2,116,302 | 5/1938 | Chernosky . |
| 2,352,145 | 6/1944 | Wright . |
| 2,611,567 | 9/1952 | Williamson . |
| 2,840,630 | 6/1958 | Born et al. ...................... 248/58 X |
| 2,891,749 | 6/1959 | Heverly . |
| 2,962,053 | 11/1960 | Epstein ......................... 138/148 X |
| 3,000,433 | 9/1961 | Kemper . |
| 3,122,346 | 2/1964 | Seiler . |
| 3,185,758 | 5/1965 | Litz . |
| 3,244,388 | 4/1966 | Coffman . |
| 3,563,503 | 2/1971 | Lancaster . |
| 3,653,618 | 4/1972 | Kindorf et al. . |
| 3,980,262 | 9/1976 | Lee . |
| 4,017,046 | 4/1977 | Hicks ............................. 248/49 X |
| 4,033,381 | 7/1977 | Newman et al. .............. 138/148 X |
| 4,139,142 | 2/1979 | Maple et al. . |
| 4,146,203 | 3/1979 | Williams ....................... 138/149 X |
| 4,323,088 | 4/1982 | McClellan . |
| 4,530,478 | 7/1985 | McClellan . |
| 4,640,480 | 2/1987 | Semedard et al. . |

FOREIGN PATENT DOCUMENTS

| | | | |
|---|---|---|---|
| 814687 | 8/1951 | Fed. Rep. of Germany ........ 248/49 |
| 2844223 | 4/1980 | Fed. Rep. of Germany ........ 285/47 |
| 28885 | of 1897 | United Kingdom ................ 138/148 |

Primary Examiner—Alvin C. Chin-Shue
Assistant Examiner—David L. Talbott
Attorney, Agent, or Firm—Bacon & Thomas

[57] ABSTRACT

A pipe support system is disclosed having one or more members interposed between a pipe support, which may be a pipe hanger strap or a support cradle, and a pipe such that the pipe is directly supported by, and spaced from, the support. The generally "U" shaped members each have a base portion, a pair of leg portions extending from the base portion and a flange portion extending from the distal end of each of the leg portions. The members are oriented such that the base portion bears against the support, while the flange portions bear against an outer surface of the pipe. External pipe insulating material may pass through the "U" shaped members between the leg portions and between the base portion and the pipe surface. The members serve to directly support the pipe from the support without compressing the insulation layer in any fashion. The "U" shaped members may be attached to semi-cylindrical cover members which extend on either side of a hanger support. The "U" shaped members may also be utilized to support a pipe upon a pipe cradle or the like.

22 Claims, 7 Drawing Sheets

U.S. Patent  Aug. 1, 1989  Sheet 1 of 6  4,852,831
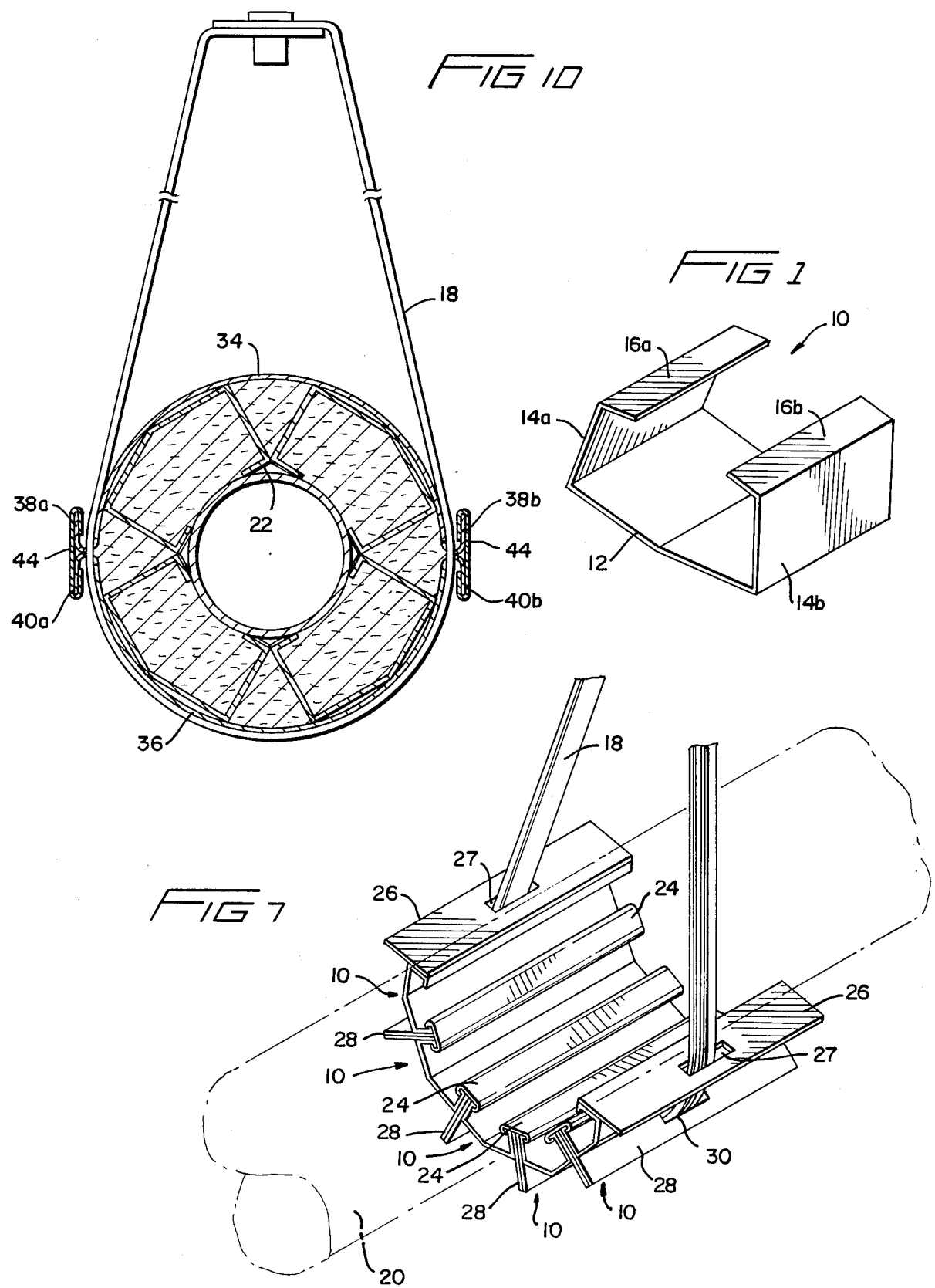

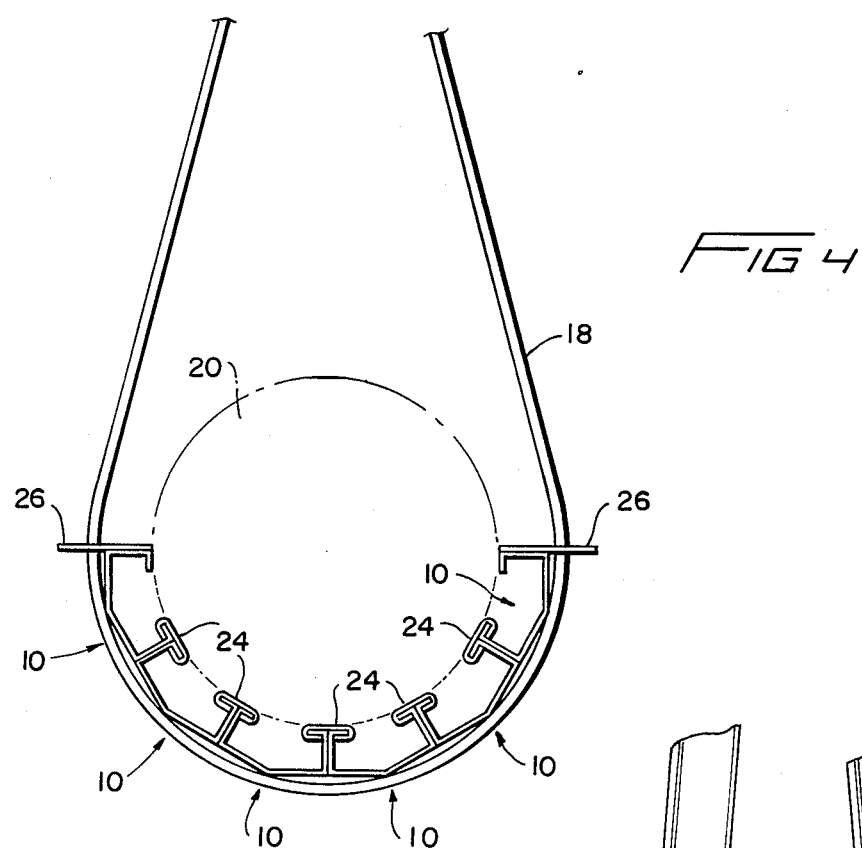
FIG 4
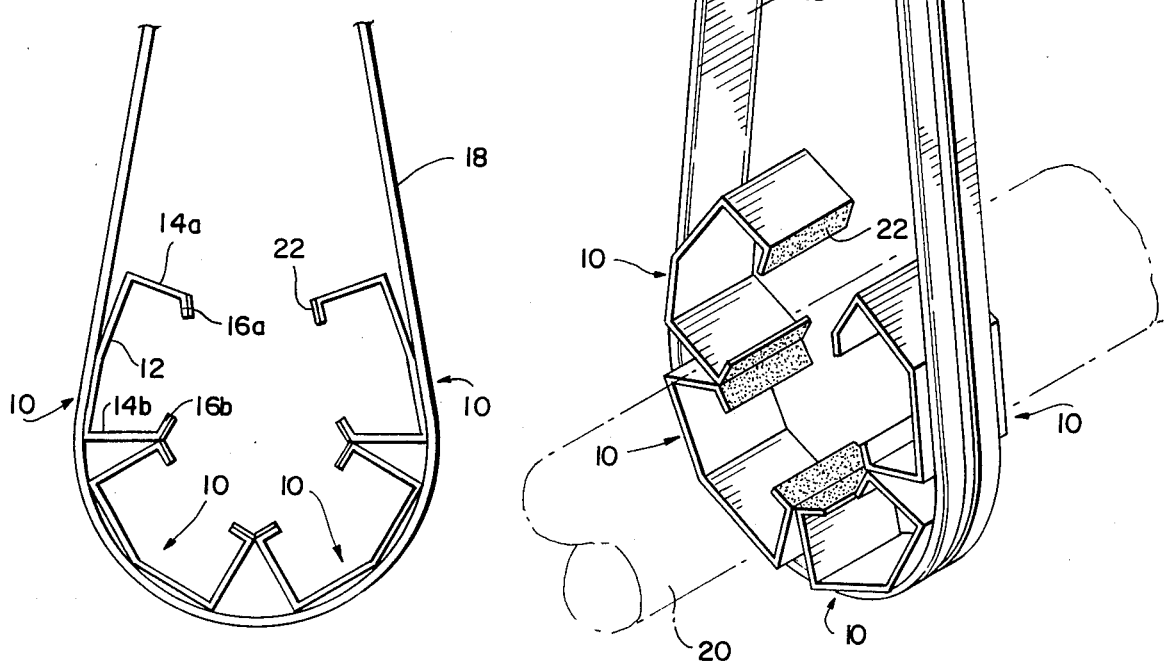
FIG 3
FIG 2

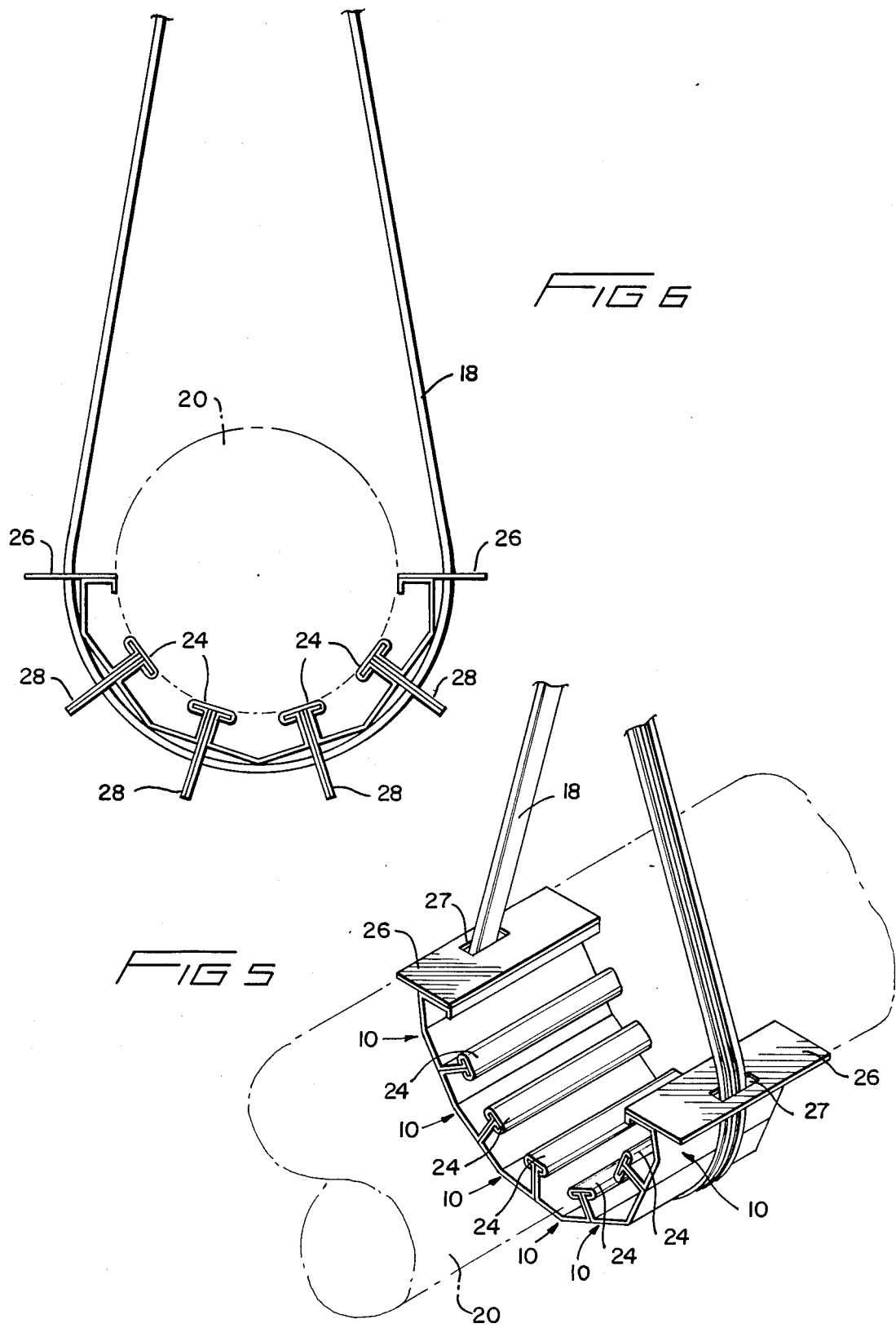

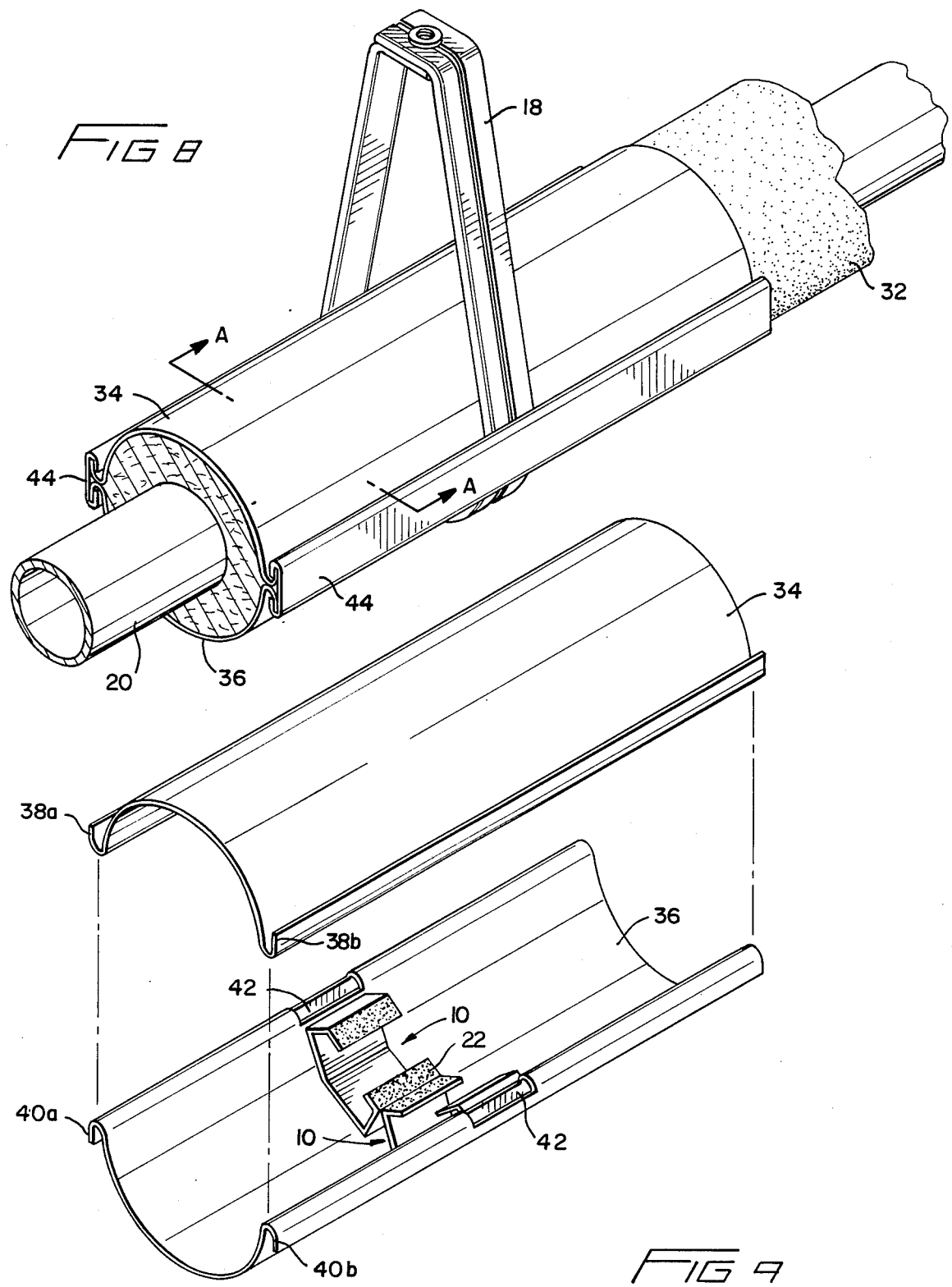

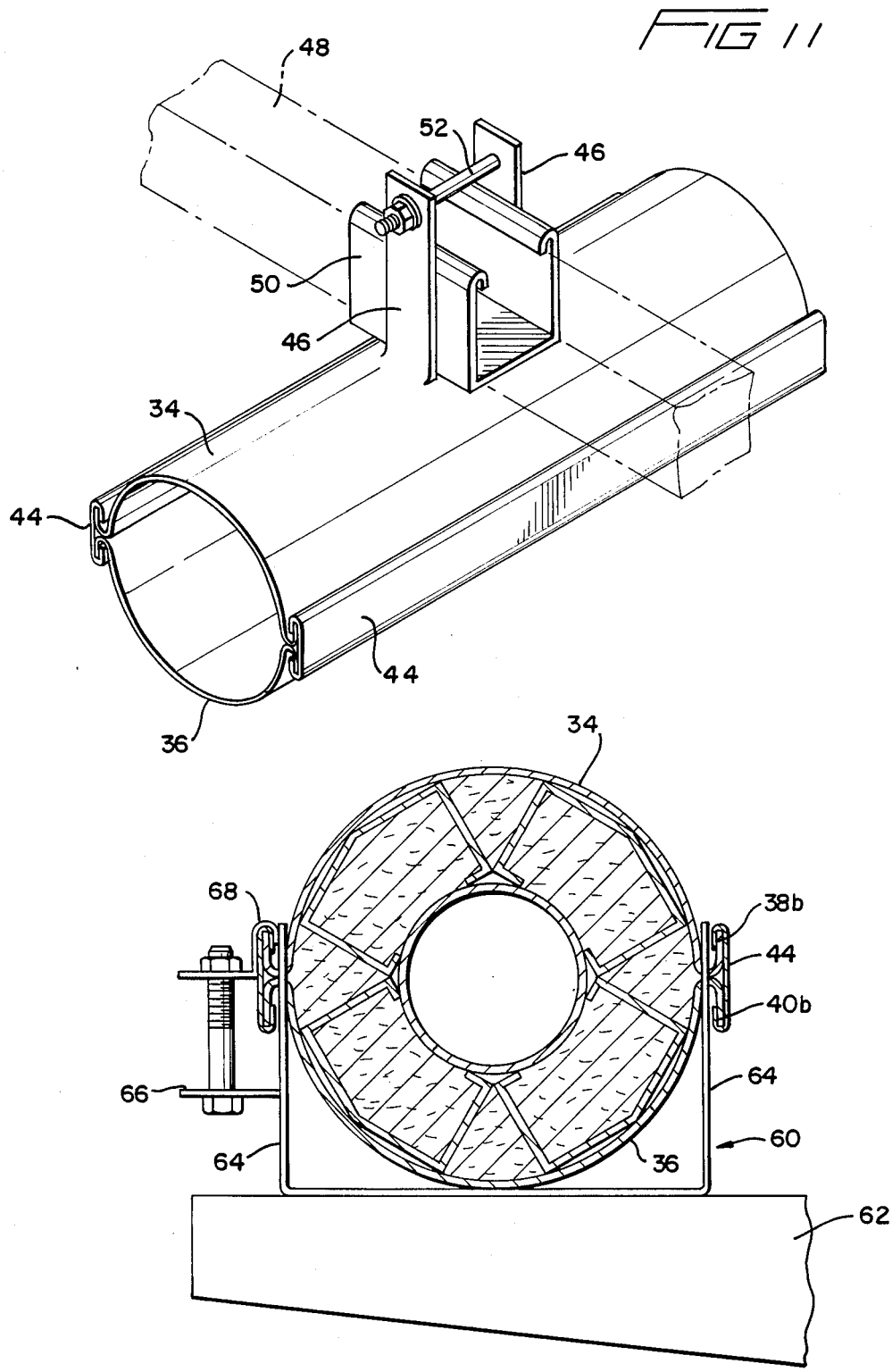

PIPE SUPPORT SYSTEM

BACKGROUND OF THE INVENTION

The present invention relates to a system for supporting a pipe, more particularly such a system that is readily fabricated and installed, and which will provide the requisite supporting forces to the pipe.

Systems for hanging or supporting pipes are, of course, well known in the art. In their most rudimentary form, pipe hangers comprise a strap material, usually metal, which passes around a lower portion of the pipe and some means to fasten the strap to a support structure above the pipe. In order to prevent excessive manufacturing and installation costs, the pipe supporting straps are rather narrow in a direction extending parallel to the longitudinal axis of the pipe. This causes increased stress concentrations in the contact area between the support strap and the pipe which may result in breakage of the strap or failure of the pipe as the pipe and hanger undergo relative motion caused by their expansion and contractions.

Such pipe hanging straps cause particular difficulties in installations wherein an insulation layer is applied over the pipe surface. In this instance, the strap typically passes around a portion of the outer surface of the insulation and will generally cause the insulation to compress, thereby defeating the insulation characteristics in this area.

It is known to provide devices extending through the insulation so as to bear directly against the pipe to prevent the hanger from compressing the insulation. It is also known to form the insulation material with a more rigid lower portion so as to support the pipe in the hanger. These devices have not completely obviated all of the problems, however, since it is generally necessary to cut or remove the insulation during the pipe hanging process to install the devices. Also, by forming the insulation with a hardened or more dense lower portion, the insulation characteristics of the layer may be reduced.

Pipe supporting cradles also may compress an insulation layer applied to the pipe, or may cause wear in the pipe wall (when no insulation layer is utilized) due to movement between the pipe and the supporting cradle caused by expansion or contraction of the pipe.

SUMMARY OF THE INVENTION

The present invention relates to a pipe supporting system which obviates the difficulties of the known pipe supporting systems.

One or more generally "U" shaped members are interposed between the pipe support, which may be a pipe hanger strap or a support cradle, and the pipe such that the pipe is directly supported by, and spaced from, the support means. The generally "U" shaped members each have a base portion, a pair of leg portions extending from the base portion and a flange portion extending from the distal end of each of the leg portions. The members are oriented such that the base portion bears against the support means while the flange portions bear against an outer surface of the pipe.

In those installations in which the pipe is to be enclosed by a layer of insulating material, the insulating material may pass through the "U" shaped members between the leg portions and between the base portion and the pipe surface. The members serve to directly support the pipe from the support means without compressing the insulation layer in any fashion. Since the contact area between the flange portions an the pipe is minimized, the insulation layer covers substantially all of the outer surface of the pipe, even in the area in which the "U" shaped members are located. This serves to minimize the heat transfer between the pipe and the surrounding structure.

The "U" shaped members may be attached to semi-cylindrical cover members which extend on either side of the hanger support. The semi-cylindrical cover members may each have flanges extending along their longitudinal edges and may be retained in assembled relationship by an elongated attaching member having a "C" shaped cross-section so as to engage corresponding flanges on each of the cover members. The longitudinal extending flanges define openings to accommodate a hanger strap or other pipe supporting means.

The "U" shaped members may also be utilized to support a pipe upon a pipe cradle or the like. Flange portions of adjacent leg portions are attached together via an elongated clamping member, the length of which may exceed the length of the "U" shaped members. A band or a strap encircles the portions of the clamping members extending beyond the "U" shaped member to affix them to the outer surface of the pipe. The supporting surface of the pipe cradle then bears against one or more base portions of the "U" shaped members so as to prevent direct contact between the cradle and the pipe wall.

BRIEF DESCRIPTION OF THE DRAWINGS

FIG. 1 is a perspective view of a pipe supporting member according to the invention.

FIG. 2 is a perspective view of a first embodiment of a pipe support system according to the invention.

FIG. 3 is a partial, front view of the pipe support system shown in FIG. 2.

FIG. 4 is a partial, front view of a second embodiment of the pipe support system according to the invention.

FIG. 5 is a partial, perspective view of the pipe support system shown in FIG. 4.

FIG. 6 is a partial, front view of a third embodiment of the pipe support system according to the invention.

FIG. 7 is a partial, perspective view of the pipe support system shown in FIG. 6.

FIG. 8 is a perspective view of a fourth embodiment of the pipe support system according to the invention.

FIG. 9 is an exploded, perspective view showing the pipe covers of FIG. 8.

FIG. 10 is a cross-sectional view taken along line A—A in FIG. 8.

FIG. 11 is a partial, perspective view of the pipe support device of FIG. 8 utilized with an alternative hanger.

FIG. 14 is a cross-sectional view of the pipe support system in FIG. 8 utilized with a cradle support.

DETAILED DESCRIPTION OF THE PREFERRED EMBODIMENTS

Figure 12:
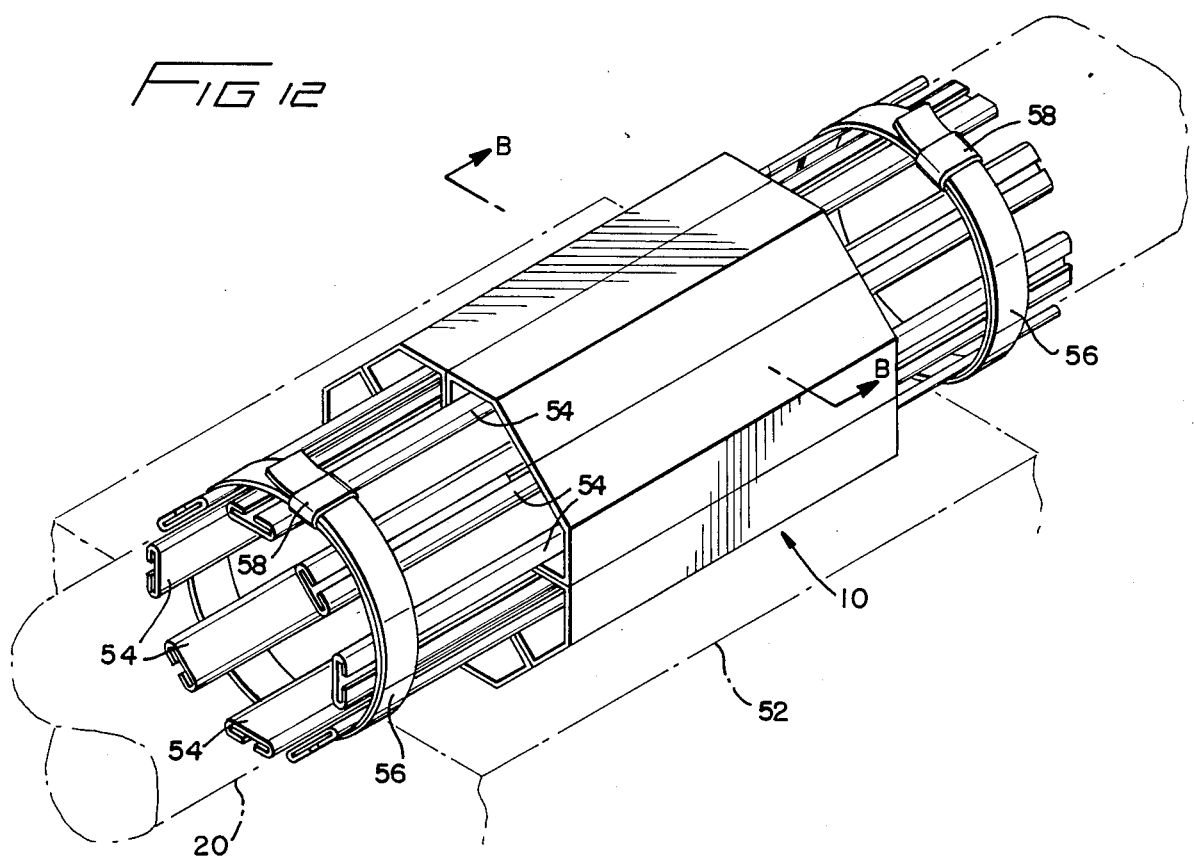
FIG. 12 is a perspective view of a fifth embodiment of the pipe support system according to the invention.

A generally "U" shaped pipe supporting member 10 is shown in FIG. 1 and comprises a base portion 12, leg portions 14a and 14b, and flange portions 16a and 16b.

The "U" shaped member 10 is interposed between a pipe and a support such that the base portion 12 bears against the support while flanges 16a and 16b bear against the outer surface of the pipe to directly support the pipe on the support.

A shown in FIGS. 2 and 3, the base portion 12 may be attached directly to a pipe hanger strap 18, which passes around the pipe and has its upper portion (not shown) attached to a support structure. Pipe 20 is supported by flanges 16 of the members 10. Although the base portions 12 are shown as being angled, it is to be understood that this portion may be flat or curved without exceeding the scope of the invention.

A layer of dielectric insulation material 22 may be applied to the exposed surfaces of flange portions 16a and 16b of each of the "U" shaped members 10 to prevent any direct contact between the members and the pipe surface. This is particularly useful wherein the member 10 and the strap 18 are fabricated from a metal which is different from that of pipe 20. The insulation layer 22 serves to prevent any electrical action between the pipe hanger system and the pipe. Base portions 12 of the members 10 may be attached to hanger strap 18 by any known means, such as spot welding, etc.

A second embodiment of the hanger system is shown in FIGS. 4 and 5 and differs from that previously described insofar as the individual "U" shaped members 10 are attached together and are not rigidly affixed to the hanger strap 18. An elongated clamping member 24, having a generally "C" shaped cross-section, slidably engages flanges 16 of adjacent "U" shaped members 10 so as to retain them together. Reinforcing guide members 26 may be attached to exposed leg portions 14 of the "U" shaped members 10 by any known means which would rigidly affix these elements together. An opening 27 is defined by each of the reinforcing guide members 26 to accommodate the passage therethrough of hanger strap 18. The interengagement of the hanger strap 18 with the reinforcing guide members 26 prevents any longitudinal displacement of the hanger strap with respect to the pipe support system. In this embodiment, the hanger strap 18 is not rigidly affixed to any of the base portions 12, but merely passes around the members 10 to support the pipe thereon. A layer of dielectric insulating material may also be attached to the surface of clamping members 24 to prevent metal-to-metal contact between the clamping members and the pipe surface. It is also within the scope of this invention to attach the leg portions of adjacent "U" shaped members 10 together by welding or the like in addition to utilizing clamping members 24.

Additional reinforcing guide members 28 may be interposed between adjacent "U" shaped members as shown in FIGS. 6 and 7. Each of the reinforcing guide members 28 define an opening 30 to accommodate the passage of hanger strap 18 therethrough. As in the case of reinforcing guide members 26, each of the reinforcing guide members 28 extends outwardly beyond the base portions 12 of the "U" shaped members 10. Hanger strap 18 passes through the openings defined by the reinforcing guide members to prevent a relative longitudinal displacement. Again, reinforcing guide members 28 may be rigidly attached between adjacent "U" shaped members 10 by affixing them to adjacent flanges by welding or the like.

In particular instances in which pipe 20 is covered by an insulation layer 32, as illustrated in FIG. 8, the "U" shaped members 10 may be attached to semi-cylindrical cover members 34 and 36. The "U" shaped members 10 may be attached to both upper and lower semi-cylindrical cover members 34 and 36, as illustrated in FIG. 10, or may be attached only to the lower cover member 36 and may have dielectric insulation layers 22 thereon. Upper semi-cylindrical cover member 34 has flanges 38a and 38b extending from its opposite longitudinal edges. Corresponding flanges 40a and 40b extend from the longitudinal edges of lower semi-cylindrical cover member 36. Each of the flanges 38a, 38b, 40a and 40b define openings 42 therethrough to accommodate the passage of hanger strap 18 around the lower portion of the semi-cylindrical cover member 36 as shown in FIG. 10. Openings 42 may also faciliate the attachment of any lateral bracing struts (not shown) to the cover members to provide lateral bracing to the pipe support system.

Cover member 34 is attached to cover member 36 about the outer surface of the insulation layer 32 by elongated, "C" shaped clamping members 44 which slide over the adjacent flanges 38a, 40a and 38b, 40b, respectively. The insulation layer may then be placed into the cover members 34 and 36 from an open end such that it passes through the "U" shaped members 10 as indicated in FIG. 10. Thus, the pipe is rigidly supported by the "U" shaped members 10, while at the same time the insulation layer virtually completely surrounds the exterior of the pipe 20. By rigidly supporting the pipe within the cover members, compression of the insulating layer is prevented so as to maximize the insulation capabilities of the layer.

Cover member 34 may have upstanding flanges 46 formed thereon to extend upwardly therefrom as indicated in FIG. 11. This will enable the pipe to be supported from a beam 48 by bracket 50 interposed between the flanges 46. The distal ends of flanges 46 are interconnected by bolt 52 or the like.

The pipe support system according to FIG. 8 may also be utilized to mount the pipe on a support cradle, as shown in FIG. 14. A pipe locating member 60 mounted on cradle 62 has arms 64 extending upwardly and passing through openings 42. One or both arms 64 has tab 66 extending outwardly therefrom. Mounting bracket 68 has a curved portion which hooks over clamping member 44 and a tab portion. Bolt 70 or the like, passes through holes in tab 66 and the tab portion of mounting bracket 68 to hold them together.

Figure 13:
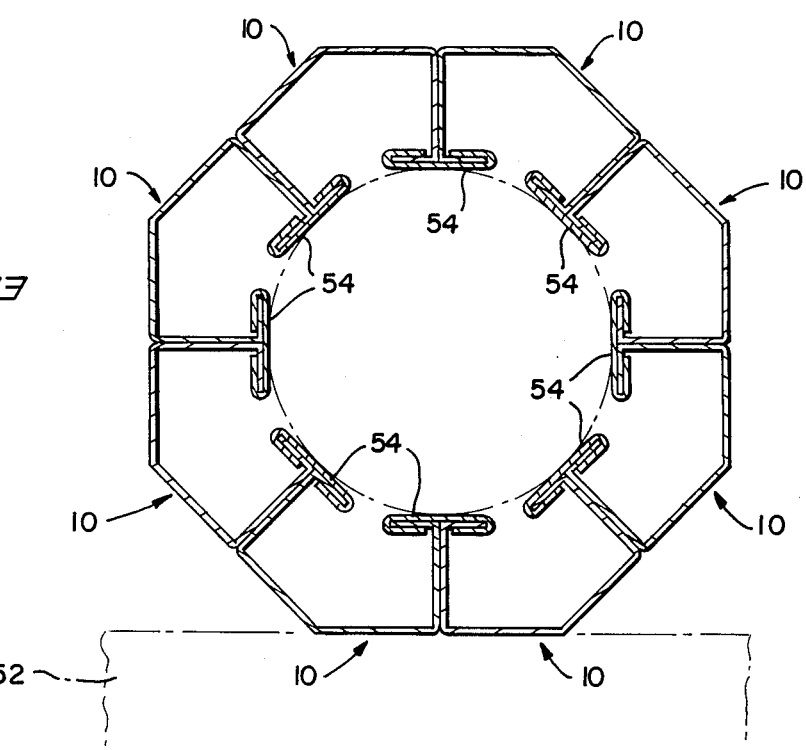
FIG. 13 is a cross-sectional view taken along line B—B in FIG. 12.

The "U" shaped members 10 according to the invention may also be utilized to support a pipe 20 on a support surface or cradle 52 as indicated in FIGS. 12 and 13. A plurality of members 10 are oriented such that they surround the pipe 20 and are retained in assembled relationship by elongated clamping members 54 which slidably engage flanges of adjacent leg portions of the "U" shaped members 10. As can be seen in FIG. 12, "C" shape clamping members 54 extend longitudinally beyond the ends of clamping members 10. The longitudinally extending ends of the clamping members are attached about the periphery of pipe 20 by clamping straps 56. Straps 56 may have any known buckle or attaching means 58 to retain them in position about the pipe and clamping members 54.

Once the device has been attached to the pipe 20, the base portions of one or more of the "U" shaped members 10 will bear against the support surface or cradle 52 so as to prevent direct contact between this surface and the periphery of pipe 20. The relative movement between the pipe 20 and the cradle 52, usually caused by expansion or contraction of the pipe, will not cause any wearing of the pipe wall which could result in its rupture.

The foregoing description is provided for illustrative purposes only and should not be construed as in any way limiting this invention, the scope of which is defined solely by the appended claims.

What is claimed is:

1. A pipe supporting device interposed between a pipe and a support means comprising:
   (a) a plurality of generally "U" shaped members, each member comprising:
      (i) a base portion adapted to bear against the support means;
      (ii) a pair of leg portions extending from the base portion, each leg portion having a distal end; and
      (iii) a flange portion extending from the distal end of each leg portion and adapted to bear against an outer surface of the pipe; and,
   (b) a guide flange member associated with at least one "U" shaped member and extending generally laterally therefrom, the guide flange member defining an opening adapted to accommodate the passage of at least a portion of the support means therethrough.

2. The pipe supporting device according to claim 1 further comprising attachment means to attach adjacent "U" shaped members together.

3. The pipe supporting device according to claim 2 wherein the attachment means comprises an elongated clamping member having a generally "C" shaped cross-section so as to engage the flange portions of adjacent leg portions.

4. The pipe supporting device according to claim 3 wherein the guide flange member is attached to a leg portion of at least one "U" shaped member such that a portion of the guide flange member extends outwardly from the leg portion beyond the base portion of the "U" shaped member.

5. The pipe supporting device according to claim 4 further comprising a guide flange member attached between each adjacent pair of leg portions such that a portion of each guide flange member extends outwardly beyond the base portions of the adjacent "U" shaped members.

6. The pipe supporting device according to claim 5 wherein each reinforcing guide member defines an opening therethrough to accommodate the pipe support means.

7. The pipe supporting device according to claim 1 further comprising a layer of dielectric insulating material on each of the flange portions to prevent direct contact between the outer surface of the pipe and the flange portions.

8. The pipe supporting device according to claim 1 further comprising a layer of thermal insulation material surrounding the outer surface of the pipe and extending through each of the "U" shaped members.

9. A system for supporting a pipe comprising:
   (a) pipe support means;
   (b) a plurality of generally "U" shaped members interposed between the pipe and the support means, each member comprising:
      (i) a base portion adapted to bear against the support means;
      (ii) a pair of leg portions extending from the base portion, each leg portion having a distal end; and
      (iii) a flange portion extending from the distal end of each leg portion and adapted to bear against an outer surface of the pipe; and
   (c) a guide flange member associated with at least one "U" shaped member and extending generally laterally therefrom, the guide flange member defining an opening adapted to accommodate the passage of at least a portion of the support means therethrough.

10. The system according to claim 9 wherein the pipe support means comprises:
    (a) a pipe hanger member; and
    (b) fastening means to attach the hanger member to a support structure.

11. The system according to claim 10 further comprising attachment means to attach adjacent "U" shaped members together.

12. The system according to claim 11 wherein the attachment means comprises an elongated clamping member having a generally "C" shaped cross-section so as to engage the flange portions of adjacent leg portions of the "U" shaped members.

13. The system according to claim 12 wherein the guide flange member is attached to a leg portion of at least one "U" shaped member such that a portion of the guide flange member extends outwardly beyond the base portion of the "U" shaped member.

14. The system according to claim 13 wherein the opening through the guide flange member accommodates the passage of the pipe hanger member therethrough.

15. The system according to claim 13 further comprising a guide flange member attached between each adjacent pair of leg portions such that a portion of each guide flange member extends outwardly beyond the base portions of the adjacent "U" shaped members.

16. The system according to claim 15 wherein each guide flange member defines an opening therethrough to accommodate the passage of the pipe hanger member therethrough.

17. The system according to claim 9 further comprising a layer of dielectric insulating material on each of the flange portions to prevent direct contact between the outer surface of the pipe and the flange portions.

18. The system according to claim 9 wherein the pipe support means comprises:
    (a) pipe cover means disposed about the pipe, a portion of the pipe cover means having the plurality of "U" shaped members mounted thereon; and,
    (b) means to support the pipe cover means from a support structure.

19. The system according to claim 18 wherein the pipe cover means comprises:
    (a) a lower, generally semi-cylindrical portion;
    (b) an upper, generally semi-cylindrical portion; and,
    (c) attaching means to attach the upper and lower portions together.

20. The system according to claim 19 wherein the attaching means comprises an elongated attaching member having a generally "C" shaped cross-section so as to engage a longitudinal flange of both the upper and lower semi-cylindrical portions.

21. The system according to claim 18 wherein the means to support the pipe cover means comprises a pipe hanger strap extending around at least a portion of the pipe cover means and passing through the guide flange member opening.

22. The system according to claim 18 wherein the means to support the pipe cover means comprises:
    (a) a pipe locating member having at least one upwardly extending arm passing through the opening in the guide flange member;
    (b) mounting bracket means engaging the pipe cover means; and,
    (c) fastening means to fasten the mounting bracket means to the at least one upwardly extending arm.

* * * * *